United States Patent
Hsu

(12) 
(10) Patent No.: US 6,871,580 B2
(45) Date of Patent: Mar. 29, 2005

(54) GASKET FOR SEALING A HEATING CHAMBER OF AN ELECTRONIC COFFEE MAKER

(75) Inventor: Tony Hsu, Yung kang (TW)

(73) Assignee: Lundar Electric Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 10/462,634

(22) Filed: Jun. 17, 2003

(65) Prior Publication Data
US 2004/0256813 A1 Dec. 23, 2004

(51) Int. Cl.⁷ .............................. A47J 31/00; F16J 15/02
(52) U.S. Cl. ........................... 99/293; 99/279; 277/590; 277/628
(58) Field of Search ...................... 99/279, 293, 302 R, 99/280, 281, 282, 283, 290; 277/918, 944, 628, 590

(56) References Cited

U.S. PATENT DOCUMENTS

| | | | | |
|---|---|---|---|---|
| 4,503,757 A | * | 3/1985 | Daugherty | 99/281 |
| 4,978,833 A | * | 12/1990 | Knepler | 392/449 |
| 5,582,411 A | * | 12/1996 | Tyler | 277/650 |

* cited by examiner

Primary Examiner—Reginald L. Alexander
(74) Attorney, Agent, or Firm—Rosenberg, Klein & Lee

(57) ABSTRACT

A gasket for sealing a heating chamber of an electronic coffee maker, the heating chamber comprises a lid, a tank, bolts and nuts. The lid comprises a base with holes at four corners, and the tank also has a base with four holes at four corners. A gasket also comprises four holes at four corners corresponding to the holes of the bases of the lid and the tank. The gasket is placed on the base of the tank, and then the lid is placed on the gasket in sequence and fastened with the bolts and the nuts to seal the heating chamber securely.

1 Claim, 3 Drawing Sheets

GASKET FOR SEALING A HEATING CHAMBER OF AN ELECTRONIC COFFEE MAKER

FIELD OF THE INVENTION

This invention relates to a gasket, and more particularly to a heating chamber of a coffee maker with a gasket to seal the heating chamber securely.

BACKGROUND OF THE INVENTION

A coffee maker has become a popular appliance to most families to brew their coffee. The coffee maker current on the market uses an O-ring 63 between a base 61 and a tank 62 with bolts and nuts to seal a heating chamber 6, as shown in FIG. 3. In order to achieve the sealing purpose, the inner diameter of the O-ring 63 must be smaller than the top inner edge of the tank 62, and a user has to pull the O-ring 63 to be fastened. This pulling may deform the O-ring and cause leakage.

In view of the above-mentioned shortcomings, a renovated coffee maker sealing structure has derived.

SUMMARY OF THE INVENTION

It is the primary object of the present invention to provide a gasket for sealing a heating chamber of an electronic coffee maker, which the gasket seals the heating chamber in a secure without leakage consideration.

It is another object of the present invention to provide the gasket for sealing a heating chamber of an electronic coffee maker, which the gasket has a longer life span.

It is a further object of the present invention to provide the gasket for sealing a heating chamber of an electronic coffee maker, which do not increase cost and provides a batter quality product.

DETAILED DESCRIPTION OF THE PREFERRED EMBODIMENT

Figure 1:
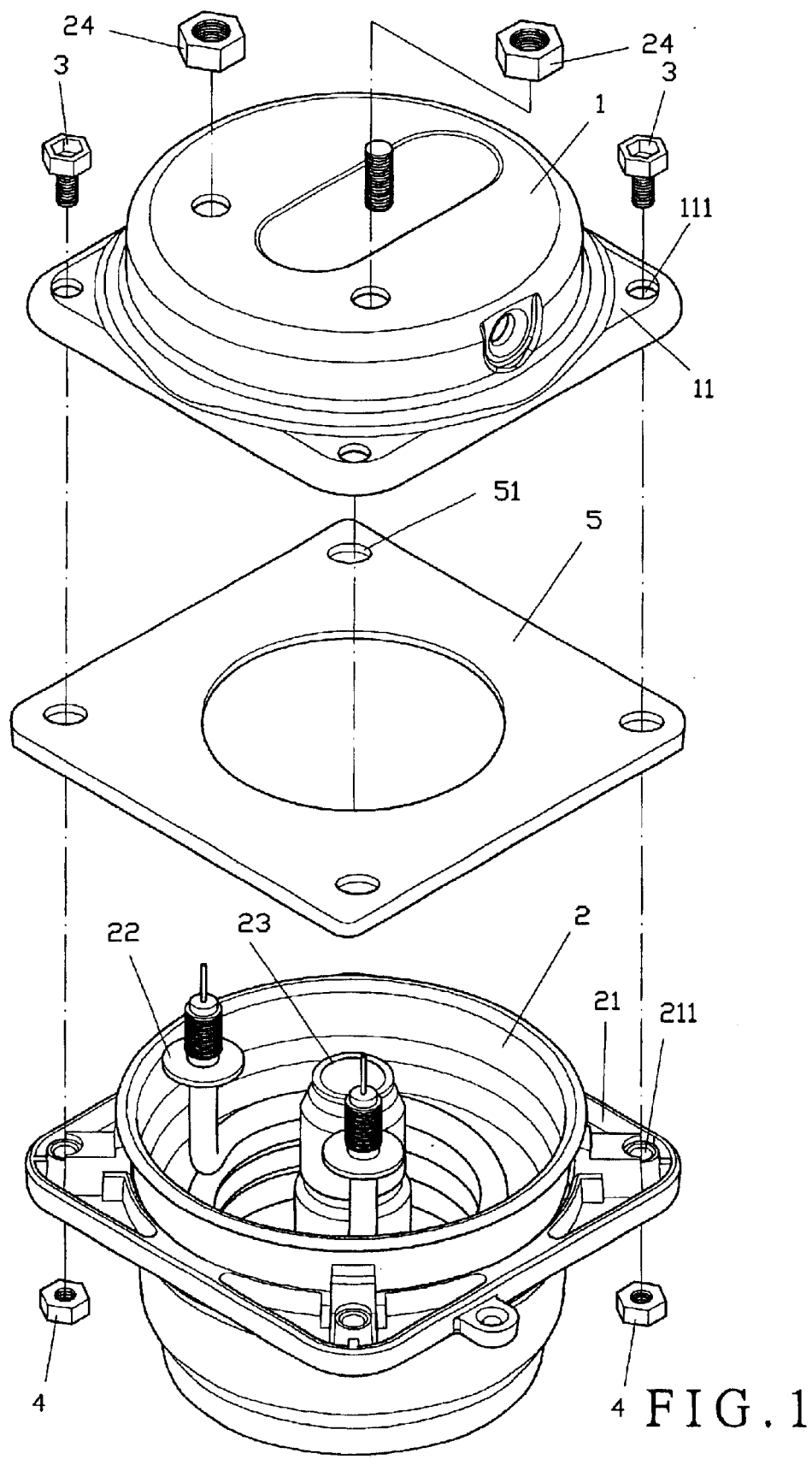
FIG. 1 is an exploded view of the present invention.

A coffee maker with a gasket to seal a heating chamber, as shown in FIG. 1, the heating chamber comprises a lid 1, a tank 2, bolts 3 and nuts 4.

The lid 1 comprises a base 11 with holes 111 at four corners. The tank 2 also comprises a base 21 with holes 211 at four corners thereof, corresponding to the four holes 111 of the base 11 of the lid 1. When placing the lid 1 on the top of the tank 2, the holes 111 of the lid 1 align with the holes 211 of the tank 2. The bolts 3 are inserted through the holes 111 and 211 and threaded with the nuts 4.

The tank 2 also accommodates a heater 22 and a heating valve 23 therein. The heater 22 is secured onto the lid 2 by a nut 24. A gasket 5 is placed between the base 11 of the lid 1 and the base 21 of the tank 2. The gasket 5 has four holes 51 at four corners corresponding to the holes 111 and 211 for insertion of the bolts 3. This provides a seamless connection.

Figure 2:
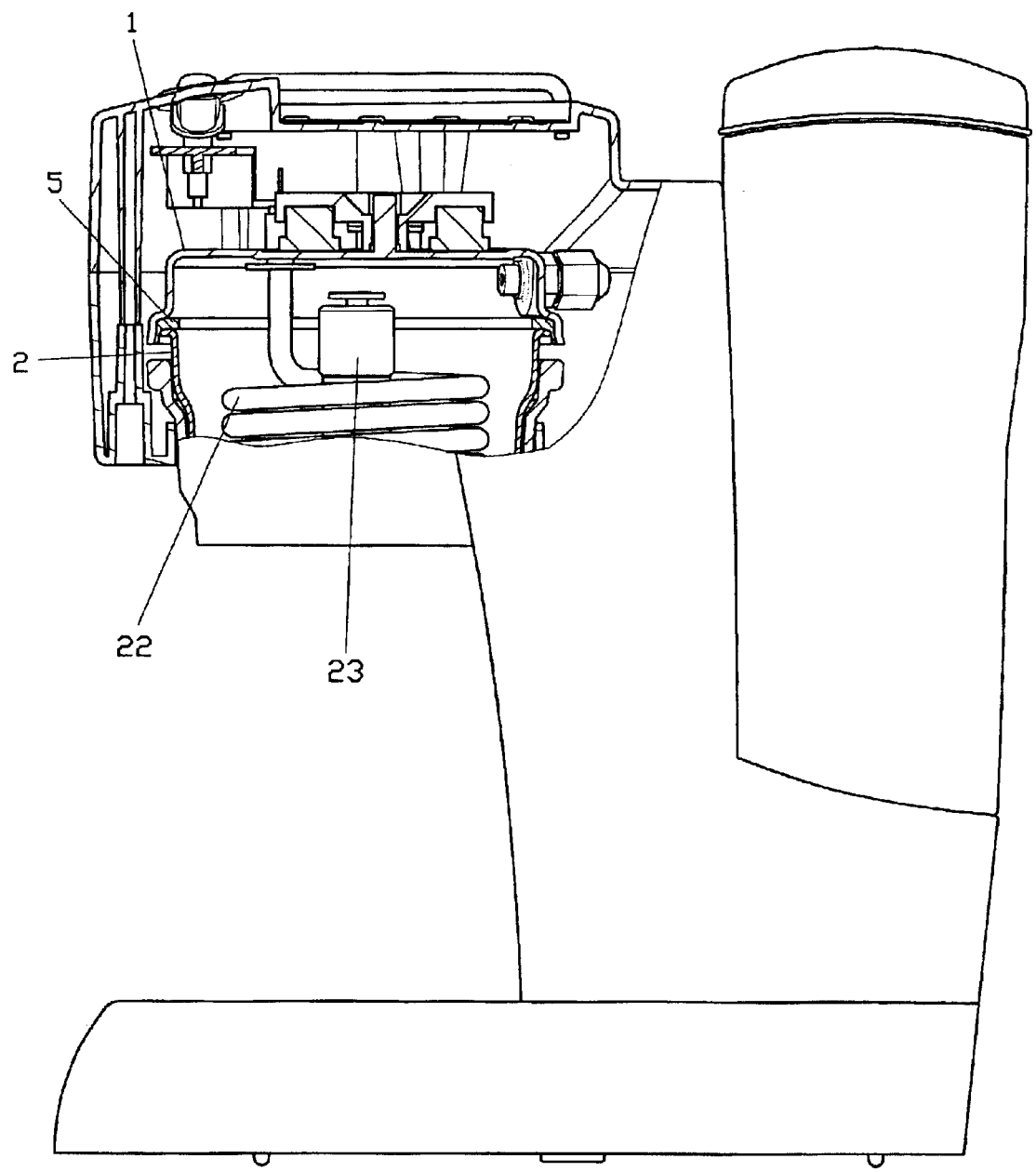
FIG. 2 is a side view of the present invention, partially sectioned.
Figure 3:
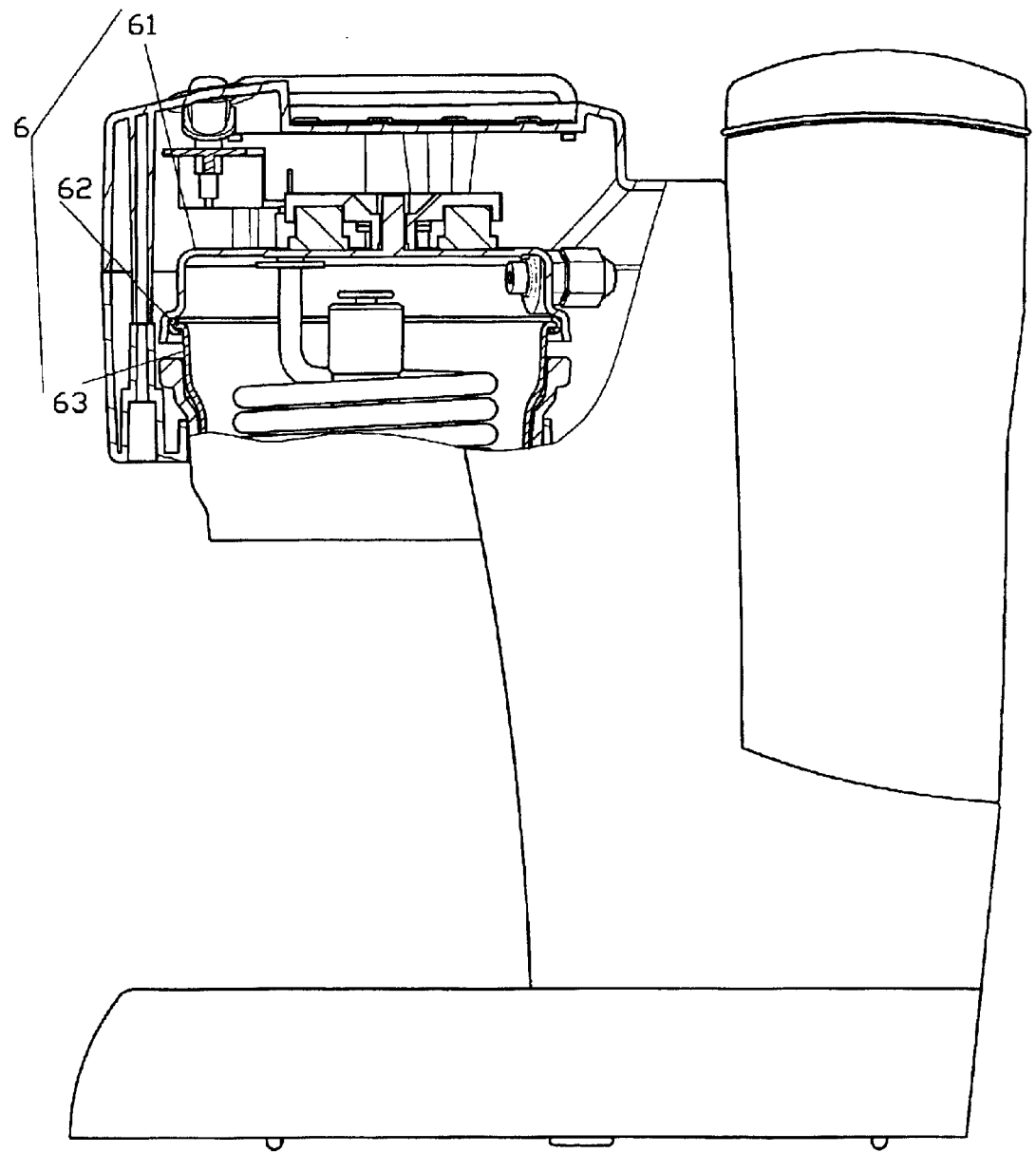
FIG. 3 is a side cross-sectional view of a prior art.

To practice, as shown in FIG. 2, the lid 1 and the gasket 5 are placed on the tank 2 and fastened with the bolts 3 and the nuts 4.

I claim:

1. A gasket for sealing a heating chamber of an electronic coffee maker, said heating chamber comprising a lid, a tank, bolts and nuts, said lid comprising a base with at least four holes at four corners, said tank comprising a base with at least four holes at four corners, said holes of said base of said lid corresponding to said holes of said base of said tank;

the gasket being captured between said base of said lid and said base of said tank to define a continuously sealed portion, said gasket including a peripheral portion extending radially outward from said sealed portion, said peripheral portion having a plurality of holes displaced from said sealed portion and corresponding to said holes of said bases of said lid and said tank for insertion of said bolts, said lid and said tank being secured together with said bolts and said nuts, said gasket being engaged between said base of said lid and said base of said tank.

* * * * *